(12) United States Patent
Xue et al.

(10) Patent No.: US 6,332,465 B1
(45) Date of Patent: Dec. 25, 2001

(54) FACE MASKS HAVING AN ELASTIC AND POLYOLEFIN THERMOPLASTIC BAND ATTACHED THERETO BY HEAT AND PRESSURE

(75) Inventors: Jianxian Xue, Maplewood; Daniel C. Casar, New Brighton, both of MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/324,412

(22) Filed: Jun. 2, 1999

(51) Int. Cl.$^7$ ................................................ A62B 18/08
(52) U.S. Cl. ........................ 128/207.11; 128/205.25; 128/206.12; 128/206.19; 128/206.21; 128/206.28
(58) Field of Search .................. 128/200.14, 205.27, 128/206.12, 206.19, 206.21, 206.28, 207.11, 205.25, 206.13; 442/181, 182, 184, 204, 306; 428/222

(56) References Cited

U.S. PATENT DOCUMENTS

| | | |
|---|---|---|
| Re. 28,102 | 8/1974 | Mayhew . |
| 3,199,548 * | 8/1965 | Conant .................. 442/181 |
| 3,788,366 * | 1/1974 | Campbell, Sr. et al. ......... 442/181 |
| 3,868,729 * | 3/1975 | Lynam ........................ 2/237 |
| 3,873,403 * | 3/1975 | Edelman .................. 442/181 |
| 4,315,792 | 2/1982 | Bottcher . |
| 4,419,993 | 12/1983 | Peterson . |
| 4,802,473 | 2/1989 | Hubbard et al. . |
| 4,827,924 | 5/1989 | Japuntich . |
| 4,834,741 * | 5/1989 | Sabee .................. 604/385.2 |
| 4,941,470 | 7/1990 | Hubbard et al. . |
| 4,968,313 * | 11/1990 | Sabee .................. 604/385.2 |
| 5,106,687 * | 4/1992 | Abu-Isa .................. 428/232 |
| 5,411,576 | 5/1995 | Jones et al. . |
| 5,440,760 | 8/1995 | Highsmith . |
| 5,472,481 | 12/1995 | Jones et al. . |
| 5,558,089 * | 9/1996 | Castiglione .................. 128/206.24 |

(List continued on next page.)

FOREIGN PATENT DOCUMENTS

| | | |
|---|---|---|
| 1011919 | 12/1965 | (GB) . |
| WO 97/10026 | 3/1997 | (WO) . |
| WO 97/32493 | 9/1997 | (WO) . |

OTHER PUBLICATIONS

Ferdinand Rodriguez, Principles of Polymer Systems, 3rd Ed., Dec. 1989.*
Royal Donson Group, Inc. packaging for *Molded Disposable Face Mask*.
3M Particulate Respirators N95 8210 and 8110S product literature (Jan. 1999).
3M 8240 R95 Particulate Respirator product literature (Aug. 1998).
Product literature for the 3M 9913 Dust/Mist Respirator located on pp. 4 and 5 of the 3M Occupational Health and Environmental Safety Products catalog (Jun. 1995).
Product sample of 3M 8210 respirator.
Product sample of 3M 8240 respirator.
Product sample of 3M 9913 respirator.
Product sample of Royal Donson Group, Inc. DTCW respirator.

*Primary Examiner*—John G. Weiss
*Assistant Examiner*—Joseph F. Weiss, Jr.
(74) *Attorney, Agent, or Firm*—Mara E. Liepa; Karl G. Hanson

(57) ABSTRACT

A filtration face mask 10 that comprises a mask body 20 and a band 30. The mask body is adapted to cover the nose and mouth of a wearer and that comprises polyolefin containing fibers. The band 30 comprises an elastic constituent and a fibrous thermoplastic constituent. The fibrous thermoplastic constituent has a melting point of about 250° C. or less and is a polyolefin or a substituted polyolefin. The band is attached to the mask body by heat and pressure at securement points 23.

20 Claims, 2 Drawing Sheets

U.S. PATENT DOCUMENTS

| | | |
|---|---|---|
| 5,620,780 | 4/1997 | Krueger et al. . |
| 5,699,792 * | 12/1997 | Reese et al. .................... 128/206.19 |
| 5,706,804 | 1/1998 | Baumann et al. . |
| 5,724,677 * | 3/1998 | Bryant et al. ............................ 2/206 |
| 5,724,964 * | 3/1998 | Brunson et al. ................ 128/206.19 |
| 5,765,556 * | 6/1998 | Brunson ......................... 128/206.19 |
| 5,803,077 * | 9/1998 | Gazzara ......................... 128/205.27 |
| 5,858,885 * | 1/1999 | Hamilton et al. .................... 442/184 |
| 5,934,275 * | 8/1999 | Gazzara ......................... 128/205.27 |
| 6,070,579 * | 6/2000 | Bryant et al. ................... 128/207.11 |
| 6,107,222 * | 8/2000 | Joseph et al. ........................ 442/412 |
| 6,117,515 * | 9/2000 | Brunson et al. ....................... 428/83 |
| 6,123,077 * | 9/2000 | Bostock et al. ................ 128/206.12 |

* cited by examiner

FACE MASKS HAVING AN ELASTIC AND POLYOLEFIN THERMOPLASTIC BAND ATTACHED THERETO BY HEAT AND PRESSURE The present invention pertains to a filtering face mask that is supported on a wearer's face by bands that contain elastic and thermoplastic polyolefin constituents and that are attached to the mask body through the application of heat and pressure.

BACKGROUND

In many environments where high amounts of dust or other contaminants are airborne, fibrous filtration face masks are commonly used to protect workers. The masks remove particulate material from the air before it is inhaled by the mask wearer. In some environments, the mask is used to protect neighboring persons, that is, those other than the mask wearer, or nearby objects, such as devices being constructed in a clean room. The protection of neighboring persons and nearby objects is afforded by removing infectious contaminants from air exhaled by the mask wearer.

Fibrous filtration face masks generally have a porous mask body that is shaped and adapted to filter the inhaled or exhaled air. Air passes through the mask material, but a filter layer in the mask removes particulates within the air stream to provide clean air for inhalation by the wearer. Similarly, exhaled air passes through the mask material, but pathogens and other contaminants are retained by the mask so that they cannot contaminate the surrounding environment.

Fibrous filtration face masks that pass National Institute for Occupational Safety and Health (NIOSH) standards for purity of inhaled air are often called respirators (see 42 C.F.R. 84 (1995)). Respirators are commonly worn to protect the wearer when the ambient air contains toxic, noxious, or other harmful materials. Under such circumstances, the respirator must not only filter the harmful substances from the air stream, but it must also fit tightly against the face of the wearer to prevent contaminants from leaking around the edge of the respirator and into the breathing zone of the wearer.

Filtering face masks exist with many various shapes and features. The filtering face mask may be a molded or formed cup-shaped mask, that is intended to securely cover the nose and mouth of the wearer. Some filtering face masks, such as surgical face masks, are essentially flat. An exhalation valve, which opens under increased internal air pressure, for example, when the wearer exhales, may be included on a filtering face mask. See, for example, U.S. Pat. No. 4,827,924 to Japuntich. Masks with exhalation valves are typically used when the underlying purpose of the mask is to remove particulates from the air to be inhaled. Other features on face masks include nose clips that may improve the fit over the wearer's nose and where the nose meets the cheeks. See U.S. Pat. No. 5,558,089 to Castiglione.

Head bands are also commonly used on masks. The bands are used to position the mask snugly over the wearer's nose and mouth. The bands are often an elastic tape or thin film attached to the edges of the mask body by mechanical systems such as staples. Other mechanical fastening systems such as stitching, snaps, and buckles are used to attach the bands to the mask body. The use of an adhesive to attach the bands is also known, as is high frequency heat bonding of bands to the mask body. See, for example, U.S. Pat. Nos. 4,802,473 and 4,941,470 to Hubbard et al.

Staples are a very common system for attaching the bands to the mask body because staples are quick and easy to install, and are fairly inexpensive. Although staples are regularly used for this purpose, there are some disadvantages associated with them. One disadvantage is that the staples are typically made from a metal, which is highly conductive and therefore quickly heats up or chills. This characteristic can cause discomfort for the mask wearer at points where the metal contacts the wearer's skin.

In some industries, staples or other mechanical fasteners are not recommended. For example, in the food industry, some locations restrict the use of face masks with staples. The rationale is that the staples could, theoretically, be removed from the mask and contaminate a food product. Thus, on face masks used in the food industry, the bands are typically attached to the mask body with an adhesive, are sewn on, or are attached by ultrasonic welding.

Attempts have been made to eliminate the use of staples and other removable mechanical fasteners by attaching the bands to the mask body through ultrasonic welding. Elastic bands that are a tape or film of elastic material have been attached to mask bodies by this method. The bands that have been attached by welding have difficulty withstand in high temperature environments because the bands are generally made from a thermoplastic elastomer. Polyester and elastic braided and knitted bands have also been attached to mask bodies by ultrasonic welding. The temperatures needed to obtain an adequate bond between the polyester in the band and a layer of the mask body are typically sufficiently high to melt layers of the mask body. The needed heating temperatures, however, may be so high that holes are melted through the thickness of the mask in the proximity of the welded area. This leads to a narrow processing window. That is, the temperature range that will provide an adequate bond is small and therefore, processing condition tolerances need to be tightly controlled when attempting to weld polyester materials. A variation either way may not provide an adequate bond or may excessively melt the mask body, resulting in holes or thin spots through the mask body. Stress from stretching the headband may enlarge the holes or cause thin spots to become holes. Such holes may allow particulates and other debris to contaminate the inhaled air stream.

Attempts also have been made to weld elastic bands to other headgear-type articles, such as a plastic face shield. See, for example, U.S. Pat. No. 5,440,760 to Highsmith. A face shield is a transparent, liquid-impermeable shield that covers the wearer's face and protects it from flying particulates and liquid spray but does not filter the air inhaled or exhaled by the user. The positioning of a face shield on a wearer's face is not as critical as the positioning of a filtering face mask.

Face shields are generally rigid and made from a lightweight material, such as polyester, polycarbonate, and the like. Highsmith discloses using a heat-bondable elastic material, which can be an elastic material surrounded by a heat-bondable cover or carrier, as a band to support a face shield on a wearer's head. This heat-bondable cover or carrier is disclosed as being polyester, polypropylene, nylon, or any combination thereof As mentioned above, face shields protect the wearer from large flying objects, and avoiding pin holes in face shields is not as critical as it is for filtering face masks. Face shields are able to tolerate band and weld imperfections, such as small pin holes melted into the shield which would not be acceptable in a filtering face mask or respirator.

SUMMARY OF THE INVENTION

The present invention provides a filtration face mask that is adapted to cover the mouth and nose of a wearer. The face mask comprises a mask body and a band, where the mask body comprises polyolefin-containing fibers and the band includes an elastic constituent and a fibrous thermoplastic constituent. The thermoplastic constituent has a melting point below about 250° C. and comprises a polyolefin, a substituted polyolefin, or a combination of these polymers. The band is attached to the mask body by the application of heat and pressure.

The present invention also provides a method for making a filtering face mask that is adapted to be retained on the head of a wearer and to cover the mouth and nose of the wear is also provided. The method comprises: providing a mask body that comprises polyolefin-containing fibers; providing a band that comprises a combination of an elastic constituent and a fibrous thermoplastic constituent; and welding the band to the mask body by the application of heat and pressure at the desired point. The thermoplastic constituent of the band has a melting point less than 250° C. and comprises a thermoplastic material selected from the group consisting of polyolefins, substituted polyolefins, or combinations of these polymers.

The present invention differs from known filtration face masks in that it uses a band that includes an elastic constituent and a fibrous thermoplastic constituent where the fibrous thermoplastic constituent has a melting point less than about 250° C. and comprises a polyolefin material. Use of such a band can provide a strong bond between the band and the face mask body, with minimal, if any, pin holes and other distortions in the filtering face mask body, which would allow contaminants to pass through the mask body without being removed. Welding a band having an elastic constituent and a fibrous thermoplastic polyolefin constituent having a melting point below 250° C. to a mask body that contains polyolefin-containing fibers can provide a better quality filtering face mask that provides better protection for the mask wearer and/or for neighboring people and nearby objects.

GLOSSARY

In reference to the invention, the following terms are defined as set forth below:

"braid" means an elongated strip that is formed by interweaving several fibrous strands to provide strands running diagonal to the production axis; "braid" encompasses biaxial and triaxial braids;

"elastic" means a material that is capable of being stretched at least 1.5 times in length in at least one dimension and then is able to recover its original size and shape within one minute after removing the deforming stress;

"filtering face mask" means a mask that covers at least the nose and mouth of a wearer and that is designed to remove contaminants from either exhaled air or from air to be inhaled; a "respirator" is a filtering face mask that meets or exceeds NIOSH standards for air purity for inhaled air;

"polymer" means a high molecular weight organic molecule formed from the combination of identical combining units;

"polymeric" means a containing a polymer;

"thermoplastic" means a polymeric material capable of softening at elevated temperatures to enable bonding to another material and, once cooled, returns to its original structure;

"elastic thread" means an elastic constituent of the band which runs in the band's longitudinal direction;

"thread" is intended to encompass any monofilaments, multifilaments, tapes, films, strands, twisted fibers, strings, cords, and the like that comprise an elastic material; and "thermoplastic yarn" means a fibrous thermoplastic constituent of the band which runs at an angle to the band's longitudinal direction; "yarn" is intended to encompass any fibrous monofilaments, multifilaments, strands, twisted fibers and yarns, strings, cords, and the like that comprise a thermoplastic material.

BRIEF DESCRIPTION OF THE DRAWINGS

FIG. 3 is an enlarged view of a band 30a.

DETAILED DESCRIPTION OF PREFERRED EMBODIMENTS

Figure 1:
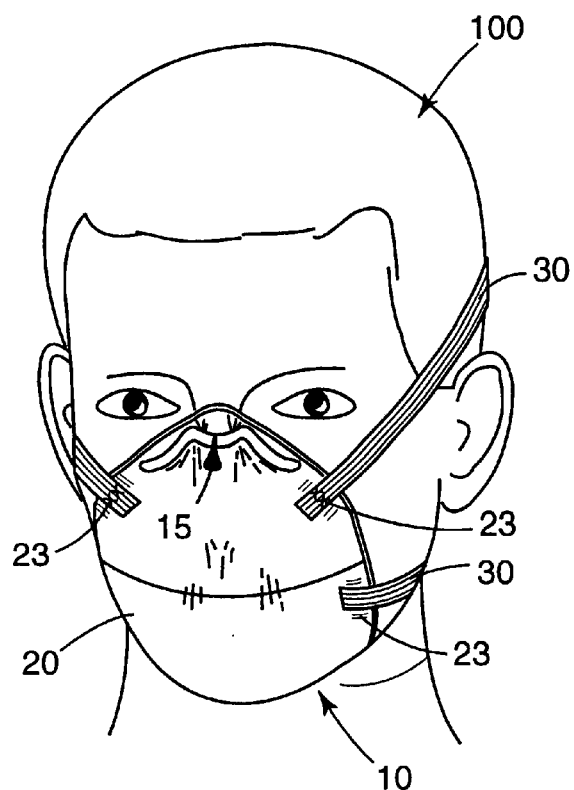
FIG. 1 is a front perspective view of a person 100 wearing a filtering face mask 10 of the present invention.
Figure 2:
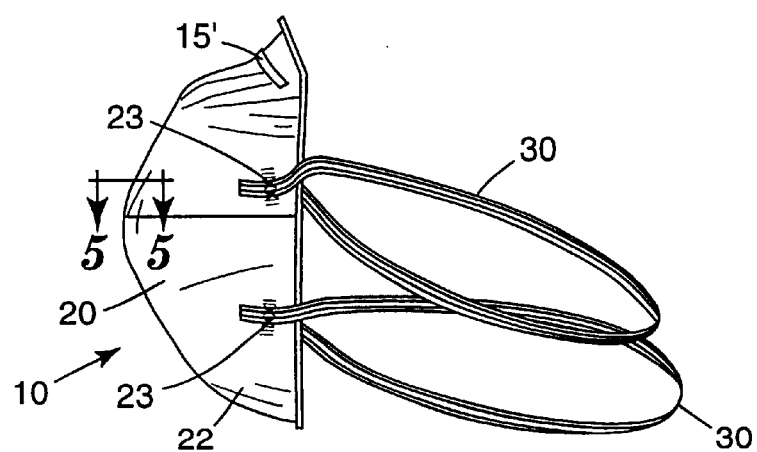
FIG. 2 is a side view of the filtering face mask 10 illustrated in FIG. 1.
Figure 3:
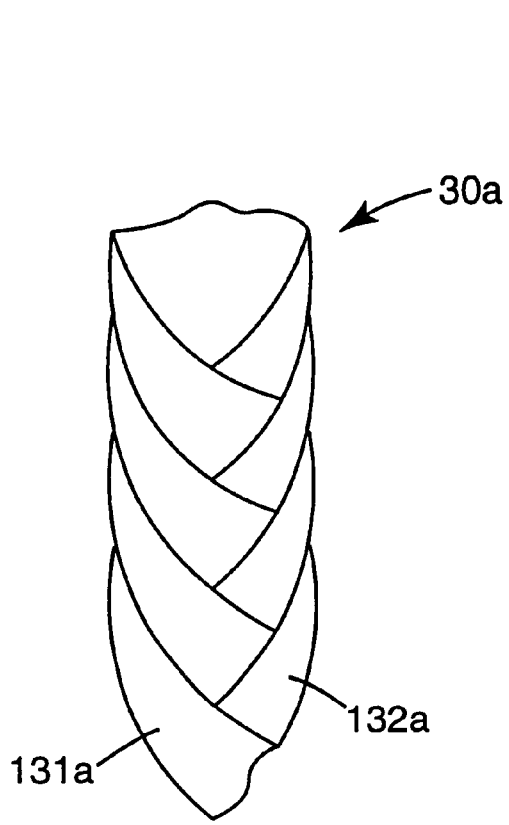

In the FIGS., like reference characters are used to indicate corresponding structure throughout the several views. FIGS. 1 and 2 show a filtering face mask 10 that comprises a mask body 20 to which are attached bands 30. Bands 30 hold the mask 10 in the proper position over the person's nose and mouth, as illustrated in FIG. 1 with mask 10 secured on a person 100. Bands 30 have been attached to mask body 20 near mask body periphery 22 at attachment points 23. The attachment is provided by applying heat and pressure to at least one of the mask body 20 or the band 30 at attachment point 23.

Mask 10 may also include optional features such as a pliable dead-soft strip of metal, such as a clip 15 over the nose portion of the mask. The pliable clips can be shaped and held in a desired fitting relationship over the nose of the wearer. A nose clip 15 that provides a good fit over the wearer's nose and where the nose meets the cheek is disclosed in U.S. Pat. No. 5,558,089 to Castiglione. Often, a soft conformable material such as foam rubber is included in the interior of the mask at the nose portion to improve the seal between the mask and the face and to made the mask more comfortable to wear. See, for example, Australian Patent 592,666 and Canadian Patent 1,296,487.

Mask 10 may include an exhalation valve (not shown) to allow exhaled air to be quickly purged from the mask interior. Exhalation valves and valve covers are disclosed, for example, in U.S. Design Pat. Nos. 347,298 and 347,299, U.S. Pat. No. 4,827,924 to Japuntich, U.S. Pat. Nos. 5,509, 436 and 5,325,892 to Japuntich et al., U.S. Pat. No. 4,537, 189 to Vicenzi, U.S. Pat. No. 4,934,362 to Braun, and U.S. Pat. No. 5,505,197 to Scholey.

Mask body 20, the major structure of mask 10, is generally configured in a cup-shaped configuration when worn to fit snugly over a person's nose and mouth. The mask body 20 is formed so as to maintain a substantially leak free contact to the wearer's face at mask periphery 22. Mask body 20 is drawn tightly against a wearer's face around the mask periphery 22 by bands 30. The mask 10 forms an interior gas space between the mask body 20 and the wearer's face. The interior gas space is separated from the ambient air or exterior gas space by the mask body 20.

The cup-shaped configuration of the mask body may take a variety of forms and sizes; see, for example, U.S. Pat. No.

4,827,924 to Japuntich, PCT publication WO 96/28217 to Bostock et al., and U.S. patent application Ser. No. 09/250,825 to Chen et al. Basically, any mask configuration that is adapted to fit at least over the nose and mouth of a person is contemplated for use in this invention.

Figure 5:
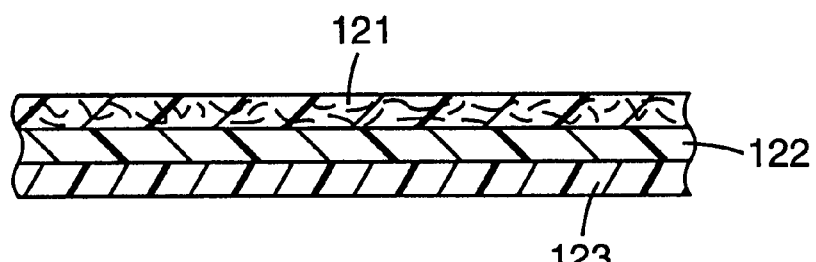
FIG. 5 is a cross sectional-view of body 20 of the filtering face mask 10 taken along line 5—5 of FIG. 2.

Mask body 20 typically comprises a plurality of layers, generally at least three layers 121, 122, 123 (FIG. 5), although some mask bodies may have only one or two layers. Typically, at least one of the layers includes a thermoplastic material, for example, polypropylene. In some embodiments, the layers include an outer cover web, a filtering material, and a shaping layer. The outermost layer 121 of the mask is typically an ou ter cover web that is exposed to the exterior atmosphere when the mask is positioned on a wearer's face. If no cover web is present, an outer shell, for example, may be the outermnost layer. A soft inner liner or shell may also be included on the surface of the mask body opposite the outermost layer or cover web to provide a smooth, soft surface for contact with the skin. When a wearer inhales, air is drawn from the mask exterior through the various layers into the mask interior. In most mask bodies 20, at least one layer comprises a filtering material.

The filtering material is typically the layer that removes the majority of the particulates and contaminants from the inhaled and/or exhaled air stream. Typically, the filtering material includes a fibrous non-woven web. Filtering materials that are commonplace often contain an entangled web of electrically charged melt-blown microfibers (BMF). BMF fibers are typically of a thermoplastic material and have an effective fiber diameter of about 10 to 15 micrometers ($\mu$m) or less. Effective fibers diameter may be determined according to the teachings of Davies, C. N., "The Separation of Airborne Dust and Particles," Institution of Mechanical Engineers, London, Proceedings 1B, 1952, particularly equation 12. When randomly entangled in a web, blown microfibers have sufficient integrity to be handled as a mat.

Examples of fibrous materials that may be used as filtering media in a mask body are disclosed in U.S. Pat. No. 5,706,804 to Baumann et. al., U.S. Pat. No. 4,419,993 to Peterson, U.S. Reissue Pat. No. Re 28,102 to Mayhew, U.S. Pat. Nos. 5,472,481 and 5,411,576 to Jones et al. The fibrous materials may contain additives to enhance filtration performance, such as the additives described in U.S. Pat. Nos. 5,025,052 and 5,099,026 to Crater et al., and may also have low levels of extractable hydrocarbons to improve performance; see, for example, U.S. patent application Ser. No. 08/941,945 to Rousseau et al. Fibrous webs also may be fabricated to have increased oily mist resistance as shown in U.S. Pat. No. 4,874,399 to Reed et al., U.S. Pat. Nos. 5,472,481 and 5,411,576 to Jones et al., and in U.S. patent applications Ser. Nos. 08/941,270 and 08/941,864, both to Rousseau et al. Electric charge can be imparted to nonwoven BMF fibrous webs using techniques described in, for example, U.S. Pat. No. 5,496,507 to Angadjivand et al., U.S. Pat. No. 4,215,682 to Kubik et al., and U.S. Pat. No. 4,592,815 to Nakao. A filtering material comprising polypropylene is a preferred filtering material.

The outer cover web, if present, or any other outermost layer, protects the filtering material from abrasive forces and retains any fibers that may come loose from the filtering material. The cover web may also have filtering abilities, although typically not nearly as good as the filtering material. The cover web may be made from nonwoven fibrous materials that include thermoplastic materials, such as polyesters, nylons, and polyolefins (such as polypropylene and polyethylene). An inner cover web, if present, may be made from the same, or different, nonwoven fibrous materials.

The filtering material is typically a very soft structureless material that generally needs some support to retain a desired shape. The shaping layer provides the support for the filtering media layer and provides the cup-shaped structure which facilitates supporting the mask onto and over the wearer's nose and mouth. The shaping layer is commonly referred to as a "shell". Often, the shaping layer provides insignificant (if any) filtering effects.

The band or bands that are used to support a mask on a person's face comprise a combination of an elastic constituent and a fibrous thermoplastic constituent to provide a band with some elastic characteristics and to allow the strap to be attached to mask body by the application of heat and pressure.

The thermoplastic constituent is a fibrous material in the form of a monofilament, multifilaments, multiple strands, a string, a self-twist yarn, a zero-twist yarn, a plurality of filaments laid together with a degree of twist, a spun yarn made from staple fibers, or the like. Typically, the thermoplastic constituent will be a continuous strand of fibers, filaments or strands having some twist. Examples of thermoplastic materials that may be used to provide the thermoplastic constituent of the band include polyolefins, such as polypropylene, polyethylene, and polybutenes, their copolymers, substituted polyolefins, and combinations thereof Polyvinyl chloride (PVC) falls within the group of substituted polyolefins. The materials used as the thermoplastic constituent of the band preferably have a melting point of about 250° C. or less, more preferably of about 225° C. or less, and still more preferably of about 200° C. or less.

The thermoplastic constituent of the band 30 may be selected to include the same material as a layer in the mask body, for example, the outermost layer or the filtering material. When similar materials, or at least materials with similar melting points, are used for the band and a mask body layer, the likelihood of pin holes and other defects in the mask body are minimized. This occurs because the materials from both the band and the mask body will melt at similar temperatures, thus minimizing the chance of overheating and deforming one material while waiting for another material to melt. Polypropylene is a material often used in at least one layer of the mask body and is a preferred material for the thermoplastic constituent. The mask body thus preferably comprises fibers that contain polyolefinic polymers and that have melting points like those described above regarding the thermoplastic constituent of the bands—that is preferably less than about 250° C., more preferably less than about 225° C., and still more preferably less than about 200° C.

The elastic constituent of the band 30 may be a thread, tape, film, fiber, strand, or the like comprising an elastic material. Examples of elastic materials that may be used to provide the elastic constituent of the band include synthetic rubbers such as polyisoprene and neoprene, natural rubber, often known as latex rubber, and derivatives of natural rubber.

Figure 4:
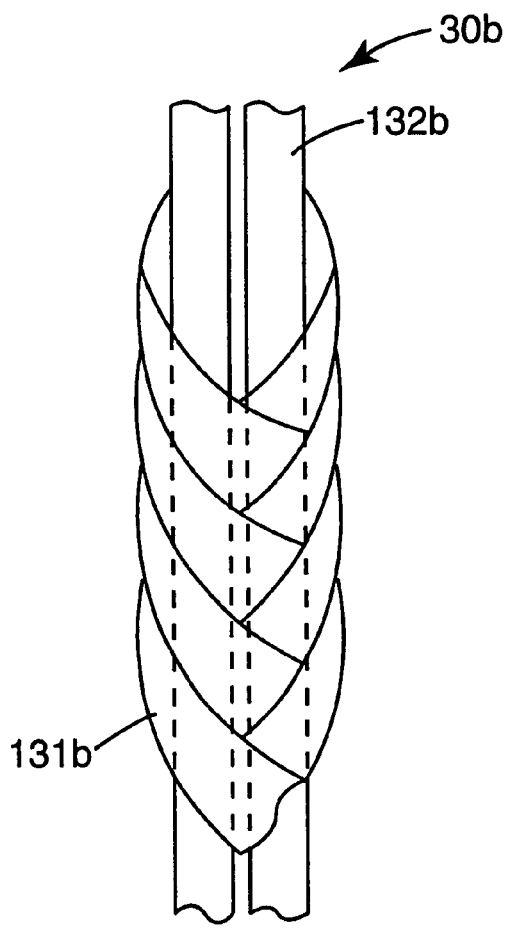
FIG. 4 is an enlarged view of a band 30b.

As discussed above, the band of the present invention is a combination of an elastic constituent and a fibrous thermoplastic constituent. The band may be formed by combining the elastic constituent and the thermoplastic constituent by methods such as knitting, weaving, braiding (including biaxial and triaxial braiding), or the like. "Biaxial braid" means a braided structure with two strand systems, one running in one direction and the other in the opposite direction; "triaxial braid" means a braided structure 30b (FIG. 4) with axial strands running in the longitudinal (production) direction and other strands running diagonal to the production axis.

The band may have an elastic constituent present at about 20 to 80% by weight of the total band weight, and a thermoplastic constituent present at about 20 to 80% by weight. Typically, the presence of the thermoplastic constituent will be approximately 20 to 50% by weight of the total band weight.

The elastic constituent and the fibrous thermoplastic constituent may occupy different positions in the band 30, 30*a*, 30*b*. As indicated above, the constituent that runs in the longitudinal or production direction of the band length is the "thread", and the constituent that is at an angle to the longitudinal direction is the "yarn" or fill yarn. For example, in a woven band, the elastic constituent may be positioned as the longitudinal component and the thermoplastic constituent may be the weft (or fill) component. Thus, the elastic constituent can be an elastic thread and the thermoplastic constituent can be a thermoplastic yarn. Alternatively, the elastic constituent may be the fill component (yarn) and the thermoplastic constituent may be the longitudinal component (thread). Or, the elastic constituent 132*a* and the thermoplastic constituent 131*a* may be intermixed throughout the band 30*a*. Preferably, the elastic constituent 132*b* extends in the longitudinal direction of the band 30*b*, and the thermoplastic constituent 131*b* extends at an angle to the elastic threads. By having the elastic constituent in the longitudinal direction, the band is stretchable in that direction, resulting in a filtering face mask that is easy to position on a wearer's head.

One embodiment of a preferred band is a triaxial braided band 30*b* comprising elastic threads 132*b* running in the longitudinal direction of the band 30*b*. Braided around the elastic threads 132*b* are thermoplastic yarns 131*b*. The number of thermoplastic yarns may be of any relation to the number of elastic threads. For example, four elastic threads may have one thermoplastic yarn braiding all the threads together. In other embodiments, there may be four, six, eight, nine, or any number of thermoplastic yarns braided around the elastic threads.

In another embodiment of the present invention, a braid is provided that uses elastic polyisoprene thread and polyolefin yarn, preferably polypropylene yarn. The entire elastic thread does not have to be a polyisoprene material; rather, the elastic thread may be a combination of materials, one of which is polyisoprene. Similarly, it is not necessary that the entire yarn is polyolefin; rather, the polyolefin yarn may be a combination of materials, one of which is a polyolefin, such as polypropylene. One example of a yarn having a combination of materials is a yarn comprising fibers having a non-polyolefin core surrounded by a polyolefin sheath, for example, a polypropylene sheath. In a further embodiment, the braid is a triaxial braid with the polyisoprene extending longitudinally along the braid and the polyolefin material braided around the polyisoprene.

Generally, the width of a band, for use on filtering face masks, ranges from about ¹⁄₁₆ inch to one inch, typically from about ⅛ to ½ inch. The most common bands for use with filtering face masks range about ³⁄₁₆ to ¼ inch wide.

The width of the band can be adjusted by using a varying number of threads when braiding the band. For example, six threads will typically provide a wider band than a band that has only four threads of the same size. Both the width and thickness of the band can be adjusted by using different sizes of threads. Threads having a larger diameter or cross-sectional area will generally provide a band thicker and wider than threads having a smaller diameter or cross-sectional area. Similarly, the width and thickness of the band can be adjusted by using different sizes of fibrous thermoplastic yarns.

In one embodiment of the present invention, the band, having the elastic constituent and the thermoplastic constituent, is permanently attached to the mask body by the application of heat and pressure to the point where the band and body adjoin. The combination of the heat and pressure is generally sufficient to partially or fully melt a portion of the band and/or a portion of the mask body, thereby creating a bond between the band and the mask body. Depending on the construction of the mask body, the outermost layer may or may not be the portion of the mask body that melts. Rather, in some embodiments, an interior layer of the mask body, for example, the filtering material, may be the layer that melts. Any melted interior layer material may ooze through an unmelted outermost mask layer and contact and bond with the band. Similarly, melted band material may ooze through the outermost layer to provide a bond with an interior layer of the mask body.

In most embodiments, it is either the thermoplastic constituent of the band that melts or the cover web or other portion of the mask body that melts. The elastic portion of the band typically retains its form. In some embodiments, a portion of both the band and the mask body may melt.

The heat and pressure used to provide the bond may be provided by essentially any method or system that is capable of providing the needed conditions, for example, hot-plate welding, flame welding, hot-gas welding, hot-knife welding, heat sealing, vibration welding or linear welding, dielectric welding, and induction welding. The heat used to melt the material to provide the bond may be provided by an external heat source or may be created during the welding process. In some embodiments, the heat and pressure are preferably provided by sonic welding or ultrasonic welding.

The degree of heat and pressure needed to attach the band to the mask body is dependent on the construction of the mask body and the band, in particular, the thermoplastic constituent. The temperature used should be sufficient so that, in combination with the pressure, either a portion of the band or mask body melts. The temperature should not be so high, however, as to distort or destroy the elastic constituent of the band. Similarly, the temperature should not be so high as to melt or otherwise distort excessive amounts of the filtering material or other layers of the mask body. Melted material from either the band or mask body form a bond between the band and mask body. After the heat source is removed, the melted polymeric material will cool and harden, thereby forming a secure and strong bond between the band and the mask body. The resulting bond formed will typically be formed by the melted thermoplastic material, however, the resulting bond may be formed as a bond of thermoset material. Basically, essentially any minimal combination of either heat and pressure sufficient to create a secure bond is contemplated by this invention.

The pressure used should be sufficient so that contact between the band and the mask body is maintained. The pressure applied may be sufficient to press the band to the mask body and force any melted material through any porous layers, for example, to force melted polymeric material into the outer most layer of the mask body. When using sonic welding, a holding pressure (often referred to as the trigger pressure) will be applied by the horn to provide contact between the band and the mask body, but the bond area will experience a higher pressure, caused by the vibration of the horn on a small surface area. It is preferable to retain some pressure on the joint area after removal of the heat, because the pressure will force the melted material against and into at least one layer of the mask body.

Ultrasonic or sonic welding is a preferred method of providing heat and pressure to produce the bond. The sonic welding apparatus itself does not provide heat to the bond area; the heat is directly generated at the bond interface by high frequency oscillation of the welding tip. This heat is then used to form the bond between the band and mask body. Examples of commercially available sonic welders usable for the present invention include a "Branson 501" sonic welder with a "1170P" controller, and a "Branson E-150" sonic welder, both available from Branson Ultrasonics Corp. of Danbury, Conn. Sonic welders are also available from, for example, Mega Corp. of Schaumburg, Ill., and Sonics & Materials, Inc., Newtown, Conn. Various tip, horn, and anvil shapes, sizes and materials may be used to provide the attachment of the band to the mask body.

Generally, when using sonic welding to provide the attachment of the band to the mask body, a weld time between about 0.1 and 5 seconds is used, typically between about 0.1 and 1.0 seconds. During welding, the horn (the portion that contacts the material to be welded) oscillates at an ultrasonic frequency. After the oscillation has stopped, the horn is retained on the welded spot for a time duration while the bonds sets; this holding time is generally between about 0 and 3 seconds, typically between about 0.1 to 1 second. The pressure provided during the welding and hold time is generally between about 50 and 400 kiloPascals (kPa), typically between about 60 and 200 kPa.

Masks made in accordance with the present invention can have the bands secured to the mask body at a weld strength that exceeds 4 pounds (lb), 5 pounds, and even 6 pounds.

The invention will be further described and illustrated in the examples which follow. The examples selected are illustrative of the invention in detail and should not be construed as being limited to such detail. All parts, percentages, ratios, etc. are by weight unless otherwise specified.

EXAMPLES

Composite bands were sonically welded onto various conventional filtering face mask bodies. The sonic welder used was a "Branson 501" sonic welder with a "1170P" controller. The horn, or portion of the welder that contacted the joint area, had a contact area of 14.5 mm by 9.8 mm which was grilled with 0.5 mm protrusions having a 0.7 mm height, spaced every 0.7 mm. To produce a weld, the band was placed on top of the mask body in the desired place, and the horn was placed on the band. The horn was slightly larger than the width of the band and thus some overlap onto the mask body was achieved. The horn was oscillated for a set time period (the weld time) at which time heat was generated. After the welding, the horn was retained on the weld area (the hold time) to allow the weld bond to set.

The following conventional filtering face masks were used as the mask bodies in the examples.

"8210" as used herein, refers to a filtering face mask commercially available from Minnesota Mining and Manufacturing Company (3M) under the trademark "8210"; this mask body has a molded shell of bicomponent polyester fibers, a filtering layer of polypropylene nonwoven material, and a nonwoven polyester cover web;

"8240" as used herein, refers to a filtering face mask commercially available from 3M under the trademark "8240"; this mask body has a molded shell of bicomponent polyester fibers, a filtering layer of polypropylene fibers treated with a fluorocarbon material, and a nonwoven polypropylene cover web; and "9913" as used herein, refers to a filtering face mask commercially available from 3M under the trademark "9913"; this mask body has a molded shell of bicomponent polyester fibers, a filtering layer of blown polypropylene microfibers, a layer of blown microfibers loaded with micron sized carbon particles, a second filtering layer of blown microfibers, and a nonwoven polypropylene cover web.

The following bands were used for the example masks:

"Band I" refers to a triaxial braided band having polyisoprene threads running in the axial direction and polypropylene yarns braided around the polyisoprene threads. The band consists of about 56% by weight polyisoprene and 44% by weight polypropylene. Band I is Temporary Style-"H12-9-1 Black" prepared by Providence Braid Co. Inc., P.O. Box 6211, Providence, R.I. 02940.

"Band II" refers to a triaxial braided band having polyisoprene threads running in the axial direction and 5 polypropylene yarns and 4 polyester yarns braided around the polyisoprene threads; the band consists of about 58% by weight polyisoprene, 21% propylene, and 21% polyester. Band II is Temporary Style-"H2-19-1 Black" prepared by Providence Braid Co. Inc.

"Band III" refers to a triaxial braided band having polyisoprene thread running in the axial direction and yarns having a polyester core and a polyethylene sheath braided around the polyisoprene threads; the band consists of about 21% by weight polyisoprene and 79% by weight bicomponent polyethylene/polyester yarns. Band III was braided by Providence Braid Co. Inc., using yarn comprised of 40% polyethylene sheath and 60% polyester core obtained from KOSA, P.O. Box 4, Highway 70 West, Salisbury, N.C. 28145-0004.

"Band A" refers to a triaxial braided band having polyisoprene threads running in the axial direction and polyester yarns braided around the polyisoprene threads; the band consists of 58% by weight polyisoprene and 42% by weight polyester. Band A is Temporary Style-"G7-22-1 White" prepared by Providence Braid Co. Inc.

The Examples were prepared by ultrasonically welding a band to a mask body according to the conditions listed below. The pressure listed was the trigger pressure provided on the horn.

| Example | Mask Body | Band, Band Width (inch) | Weld Time (seconds) | Hold Time (seconds) | Pressure (kPa) |
| --- | --- | --- | --- | --- | --- |
| 1 | 8210 | I, 3/16 | 0.2 | 0.5 | 70 |
| 2 | 8210 | I, 3/16 | 0.2 | 0.5 | 80 |
| 3 | 8210 | I, 3/16 | 0.2 | 0.5 | 100 |
| 4 | 8210 | I, 3/16 | 0.2 | 0.5 | 140 |
| 5 | 8210 | I, 3/16 | 0.15 | 0.5 | 140 |
| 6 | 8210 | I, 3/16 | 0.2 | 0.5 | 90 |
| 7 | 8240 | I, 3/16 | 0.2 | 0.5 | 80 |
| 8 | 9913 | I, 3/16 | 0.2 | 0.5 | 80 |
| 9 | 8210 | II, 3/16 | 0.2 | 0.5 | 140 |
| 10 | 8210 | III, 3/16 | 0.15 | 0.5 | 80 |
| Comp. A | 8210 | A, 1/4 | 0.2 | 0.5 | 140 |
| Comp. B | 8240 | A, 1/4 | 0.2 | 0.5 | 140 |

Comparative Example C was a filtering face mask commercially available from 3M under the trade designation "9913". The mask body is described above, and the band was a 3/16 inch wide polyisoprene tape, attached to the mask body by conventional staples.

Comparative Example D was a filtering face mask commercially available from 3M under the trade designation "8246". The mask body was similar to a "9913" mask body except that the polypropylene microfibers were treated with fluorocarbon, and the band was a 3/16 inch wide polyisoprene tape, attached to the mask body by conventional staples.

No pin holes or other deformation of the mask body were witnessed on the Example 1–10 sample masks. All welds were solid and did not open when pulled on under normal use conditions.

Weld Strength Test

The weld strength of the band to the mask body (i.e., the bonding strength) was tested by the mask body in one jaw and the band in the second jaw of an Instron tensile testing machine. The gauge distance between the jaws was one inch. This distance between the jaws was increased at a rate of 20 inches/minute and the force (in pounds) was measured. The point at which the band detached from the mask body was recorded as the maximum weld strength.

Seven to nine examples were tested to provide a standard deviation of the weld strength. The results are reported in the table below.

| Example | Weld Strength (lb) | Standa rd Deviation |
|---------|--------------------|--------------------|
| 1 | 5.39 | 0.59 |
| 2 | 6.17 | 0.56 |
| 3 | 5.95 | 0.63 |
| 4 | 5.86 | 0.54 |
| 5 | 5.33 | 0.46 |
| 6 | 6.01 | 0.68 |
| 7 | 5.51 | 0.86 |
| 8 | 5.63 | 0.47 |
| 9 | 4.26 | 0.48 |
| 10 | 6.8 | 1.09 |
| Comp. A | 3.27 | 0.29 |
| Comp. B | 3.62 | 0.39 |
| Comp. C | 4.52 | 0.58 |
| Comp. D | 5.61 | 0.87 |

The above data show that good weld strength between the band and the mask body, comparable to conventional and stapled products, can be achieved through use of a band that has an elastic constituent and a thermoplastic constituent, the thermoplastic constituent being a polyolefin having a melting point less than about 250° C., and the band sonically welded to the mask body.

All of the patents and patent applications cited above are incorporated by reference into this document in total.

The invention may be suitably practiced in the absence of any electret or item not specifically described above.

What is claimed is:

1. A filtration face mask that comprises:
   a mask body that is adapted to cover a mouth and nose of a wearer and that comprises polyolefin containing fibers; and
   a band that comprises an elastic polyisoprene constituent and a fibrous thermoplastic constituent, the fibrous thermoplastic constituent having a melting point of about 250° C. or less and being selected from the group consisting of polyolefins, substituted polyolefins, and combinations thereof, the elastic polyisoprene constituent and the thermoplastic constituent being knitted, woven, or braided together, the band being attached to the mask body by the application of heat and pressure.

2. The face mask of claim 1, wherein the thermoplastic constituent comprises polypropylene.

3. The face mask of claim 1, wherein the band comprises a braided band.

4. The face mask of claim 3, wherein the band comprises a triaxial braided band.

5. The face mask of claim 3, wherein the elastic constituent is an elastic thread and the thermoplastic constituent is a thermoplastic yarn.

6. The face mask of claim 5, wherein the thermoplastic yarn is braided around the elastic thread.

7. The face mask of claim 1, wherein the thermoplastic constituent has a melting point of about 225° C. or less.

8. The face mask of claim 1, wherein the thermoplastic constituent is present at about 20 to 80% by weight of the band.

9. The face mask of claim 8, wherein the thermoplastic constituent is present at about 20 to 50% by weight of the band.

10. The face mask of claim 1, wherein when worn by a user, the mask body has an inner surface oriented toward a user's face and an outer surface oriented away from a user's face, the mask body includes a filtering layer which is made of a thermoplastic material.

11. The face mask of claim 10, wherein the filtering layer comprises polypropylene.

12. The face mask of claim 1, wherein when worn by a user, the mask body has an inner surface oriented toward a user's face and an outer surface oriented away from a user's face, the outer surface comprising a thermoplastic material.

13. The face mask of claim 12, wherein the outer surface comprises a thermoplastic material selected from the group consisting of polyolefins, polyesters, and nylons.

14. The face mask of claim 13, wherein the thermoplastic material comprises polypropylene.

15. A method of making a filtering face mask, which method comprises:
   (a) providing a mask body that is adapted to cover a nose and mouth of a wearer and that comprises polyolefin-containing fibers;
   (b) providing a band that comprises a combination of an elastic polyisoprene constituent and a fibrous thermoplastic constituent, the combination providing a knitted, woven, or braided band, the thermoplastic constituent having a melting point less than 250° C. and comprising a thermoplastic material selected from the group consisting of polyolefins and substituted polyolefins; and
   (c) welding the band to the mask body at the desired point.

16. The method of claim 15, wherein the step of providing a band that comprises a combination of an elastic constituent and a thermoplastic constituent comprises providing a band of thermoplastic yarn braided around the elastic thread.

17. The method of claim 15, wherein the step of providing a band that comprises a combination of an elastic constituent and a thermoplastic constituent comprises providing a band of polyisoprene thread and polypropylene yarn.

18. The method of claim 15, wherein the step of welding the band to the mask body at the desired point comprises welding the band to the mask body by ultrasonic welding.

19. The method of claim 15, wherein the band is welded to the mask body at a weld strength that exceeds 4 pounds.

20. The method of claim 15, wherein the band is welded to the mask body at a weld strength that exceeds 5 pounds.

* * * * *

UNITED STATES PATENT AND TRADEMARK OFFICE
CERTIFICATE OF CORRECTION

PATENT NO. : 6,332,465 B1
DATED : December 25, 2001
INVENTOR(S) : Xue et al.

It is certified that error appears in the above-identified patent and that said Letters Patent is hereby corrected as shown below:

Column 2,
Line 21, delete "have difficult withstand in" and replace with -- sometimes cannot withstand --.

Column 5,
Line 13, "ou ter" should read as -- outer --.
Line 16, "outermnost" should read as -- outermost --.

Column 11,
Line 15, insert -- placing -- between "by" and "the".

Signed and Sealed this

Nineteenth Day of March, 2002

Attest:

Attesting Officer

JAMES E. ROGAN
Director of the United States Patent and Trademark Office